(12) United States Patent
Pinnavaia et al.

(10) Patent No.: US 6,465,387 B1
(45) Date of Patent: Oct. 15, 2002

(54) COMBINED POROUS ORGANIC AND INORGANIC OXIDE MATERIALS PREPARED BY NON-IONIC SURFACTANT TEMPLATING ROUTE

(75) Inventors: Thomas J. Pinnavaia, East Lansing, MI (US); Louis Mercier, Sudbury (CA)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 09/691,092

(22) Filed: Oct. 18, 2000

Related U.S. Application Data

(62) Division of application No. 09/375,306, filed on Aug. 12, 1999.

(51) Int. Cl.[7] .......................... B01J 31/00; B01J 20/00; C09K 3/32; C01B 31/16

(52) U.S. Cl. ..................... 502/158; 502/401; 502/405; 502/407; 502/240; 502/263; 516/100; 252/184

(58) Field of Search ................................ 252/179, 184; 516/100; 502/158, 401, 405, 407, 240, 263

(56) References Cited

U.S. PATENT DOCUMENTS

| | | | |
|---|---|---|---|
| 3,702,886 A | 11/1972 | Argauer et al. ............ | 423/705 |
| 3,709,979 A | 1/1973 | Chu .......................... | 423/700 |
| 4,108,881 A | 8/1978 | Rollmann et al. .......... | 423/708 |
| 4,151,189 A | 4/1979 | Rubin et al. ................ | 423/705 |
| 4,391,785 A | 7/1983 | Rosinski et al. ............ | 423/706 |
| 5,318,846 A | 6/1994 | Bruening et al. ........... | 428/375 |
| 5,334,368 A * | 8/1994 | Beck et al. ................. | 423/704 |
| 5,446,182 A | 8/1995 | Bruening et al. ........... | 556/427 |
| 5,622,684 A | 4/1997 | Pinnavaia et al. .......... | 423/702 |
| 6,162,414 A * | 12/2000 | Pinnavaia et al. .......... | 423/701 |

OTHER PUBLICATIONS

Kresge et al., Nature, vol. 359, (Oct. 22, 1992) pp. 710–712.*
Brown et al., Chem Comm. (Jan. 7, 1999) pp. 69–70.*
Meier et al., Atlas of Zeolite Structure types, Butterworth, London, pp. 451–469 (1992), Month unknown.
Barrer et al., Zeolites, vol. 1, 130–140 (1981) (Oct.).
Lok et al., Zeolites, vol. 3, 282–291 (1983) (Oct.).
Davis et al., Chem Mater., vol. 4, No. 4 756–768 (1992), Month unknown.
Gies et al., Zeolites, vol. 12, 42–49 (1992) (Jan.).
Hearmon et al., Zeolites, vol. 10, 608–611 (1990) (Jul./Aug.).
Monnier, A., et al., Science, 261, 1299 (1993) (Sep.).
Tanev, P.T., et al., Science, 267, 865 (1995) (Feb.).
Tanev, P.T., et al., Chem. Mater., 8, 2068 (1996) Month unknown.
Bagshaw, S.A., et al., Science, 269, 1242 (1995) (Sep.).
Prouzet, E., et al, Angew. Chem. Int. Ed. Eng. 36, 516 (1997) Month unknown.
Brunel, D., et al., Stud. Surf. Sci. Catal. 97, 173 (1995) Month unknown.
Cauvel, A., et al., AIP Conf. Proc 477–484 (1996) Month unknown.
Mercier, L., et al., Adv. Mater. 9, 500 (1997) Month unknown.

(List continued on next page.)

Primary Examiner—Daniel S. Metzmaier
(74) Attorney, Agent, or Firm—Ian C. McLeod (57) ABSTRACT

A method for preparing synthetic, semi-crystalline, porous inorganic oxide composition containing a reactive organic silane moiety which is on the surface of pore walls. The composition is prepared from a poly(oxyalkylene) based surfactant and a hydrolyzable organic silane. The surfactant is preferably a poly(ethylene) oxide, a poly(propylene) oxide polymer or mixtures thereof. The organic silane is preferably mercaptopropylsilane. The compositions are particularly useful as adsorbents, and catalysts.

16 Claims, 8 Drawing Sheets

OTHER PUBLICATIONS

Feng, X., et al., Science 276, 923 (1997) (May).
Tanev, P.T., et al., Nature 368, 321 (1994) (Mar.).
Maschmeyer, T., et al., Nature 378, 159 (1995) (Nov.).
Burkett, S.L., et al., J. Chem. Soc. Chem. Commun. 1367 (1996) Month unknown.
Fowler, C.E., et al., J. Chem. Soc. Chem Commun. 1769 (1997) Month unknown.
Lim, M.H., et al., Chem. Mater, 10, No. 2 467 (1998) Month unknown.
Van Rhijn, W.M., et al., J. Chem. Soc., Chem Commun. 317 (1998) Month unknown.

Macquarrie, D.J., J. Chem. Soc., Chem. Commun. 1961–1962 (1996) Month unknown.

Sing, et al., Pure Appl. Chem. vol. 57, No. 4, 603–619 (1985) Month unknown.

Horvath, G., et al., J. chem. Eng. Jap 16, No. 6, 470 (1983) Month unknown.

Richer, Roger, et al., Chem. Commun., 1775–1776 (1998), (Aug.).

* cited by examiner

Igepal RC-760

PEO₁₈

FIG. 4B

Fatty Acid Ethoxylate

FIG. 5

Pluronic 64 L

FIG. 6

Tetronic

FIG. 7

Fatty Amine Ethoxylate

FIG. 8

Fatty Acid PPO/PEO block co-polymer

COMBINED POROUS ORGANIC AND INORGANIC OXIDE MATERIALS PREPARED BY NON-IONIC SURFACTANT TEMPLATING ROUTE

This application is a divisional of copending application(s) application Ser. No. 09/373,306 filed on Aug. 12, 1999.

STATEMENT REGARDING FEDERALLY SPONSORED RESEARCH OR DEVELOPMENT

Government Rights

The invention described in this application was sponsored by National Institute of Environmental Health Sciences (NIEHS) Grant ES04911. The U.S. Government has certian rights to this invention.

BACKGROUND OF INVENTION (1) Field of Invention

This invention relates to the synthesis of crystalline, combined porous inorganic and organic oxide materials possessing uniform framework-confined mesopores in the range 1 to $10^2$ nm. The organic oxide precursors are hydrolyzable organic silanes which are incorporated into the framework. In particular, the present invention relates to such materials where the formation of the mesoporous structure is accomplished by a self-assembly mechanism involving complexation and/or hydrogen (H) bonding between aqueous or alcoholic emulsions of various nonionic poly(oxyalkylene) based surfactants and various mixed neutral inorganic and organic oxide precursors. This is followed by hydrolysis and subsequent condensation of hydrolysis products at ambient reaction temperatures. This templating approach allows for the removal of template through solvent extraction.

(2) Description of Prior Art

Modern human activities rely greatly upon porous solids of both natural and synthetic design. The pore structures of such solids are generally formed during crystallization or during subsequent treatments. These solid materials are classified depending upon their predominant pore sizes: (i) microporous, with pore sizes <1.0 nm; (ii) macroporous, with pore sizes exceeding 50.0 nm; and mesoporous, with pore sizes intermediate between 1.0 and 50.0 nm. Macroporous solids find limited use as adsorbents or catalysts owing to their low surface areas and large non-uniform pores. Micro- and mesoporous solids however, are widely utilized in adsorption, separation technologies and catalysis. There is an ever increasing demand for new, highly stable well defined mesoporous materials because of the need for ever higher accessible surface areas and pore volumes in order that various chemical processes may be made more efficient or indeed, accomplished at all.

Porous materials may be structurally amorphous, paracrystalline or crystalline. Amorphous materials, such as silica gel or alumina gel, do not possess long range crystallographic order, whereas para-crystalline solids such as γ- or η-alumina are semi-ordered, producing broad X-ray diffraction peaks. Both these classes of materials exhibit very broad pore distributions predominantly in the mesoporous range. This wide pore distribution however, limits the effectiveness of catalysts, adsorbents and ion-exchange systems prepared from such materials.

Zeolites and some related molecular sieves, such as alumino-phosphates and pillar interlayered clays, possess rigorously uniform pore sizes. Zeolites are highly crystalline microporous aluminosilicates where the lattice of the material is composed of $IO_4$ tetrahedra (I=Al, Si) linked by sharing the apical oxygen atoms. Cavities and connecting channels of uniform size form the pore structures which are confined within the specially oriented $IO_4$ tetrahedra (Breck, D. W., *Zeolite Molecular Sieves: Structure, Chemistry and Use*; Wiley and Sons; London, pages 1 to 100 (1974)). Zeolites are considered as a subclass of molecular sieves owing to their ability to discriminate small molecules and perform chemistry upon them. Molecular sieves in general are materials with crystalline frameworks in which tetrahedral Si and/or Al atoms of a zeolite or zeolitic lattice are entirely or in part substituted by other atoms such as B, Ga, Ge, Ti, Zr, V, Fe or P. Negative charge is created in the zeolite framework by the isomorphous substitution of $Si^{4+}$ ions by $Al^{3+}$ or similar ions. In natural zeolites, this charge is balanced by the incorporation of exchangeable alkali or alkaline earth cations such as $Na^+$, $K^+$, $Ca^{2+}$. Synthetic zeolites utilize these and other cations such as quaternary ammonium cations and protons as charge balancing ions. Zeolites and molecular sieves are generally prepared from aluminosilicate or phosphate gels under hydrothermal reaction conditions. Their crystallization, according to the hereafter discussed prior art, is accomplished through prolonged reaction in an autoclave for 1–50 days and oftentimes, in the presence of structure directing agents (templates). The correct selection of template is of paramount importance to the preparation of a desired framework and pore network. A wide variety of organic molecules or assemblies of organic molecules with one or more functional groups are known in the prior art to provide more than 85 different molecular sieve framework structures. (Meier et al., *Atlas of Zeolite Structure types*, Butterworth, London, pages 451 to 469 (1992)).

Recent reviews on the use of templates and the corresponding structures produced, as well as the mechanisms of structure direction have been produced by Barrer et al., Zeolites, Vol. 1, 130–140, (1981); Lok et al., Zeolites, Vol. 3, 282–291, (1983); Davis et al., Chem Mater., Vol. 4, 756–768, (1992) and Gies et al. Zeolites, Vol 12, 42–49, (1992). For example, U.S. Pat. No. 3,702,886 teaches that an aluminosilicate gel (with high Si/Al ratio) crystallized in the presence of Quaternary tetrapropyl ammonium hydroxide template to produce zeolite ZSM-5. Other publications teach the use of different organic templating agents and include; U.S. Pat. No. 3,709,979, wherein quaternary cations such as tetrabutyl ammonium or tetrabutyl phosphonium ions crystallize ZSM-11 and U.S. Pat. No. 4,391,785 demonstrates the preparation of ZSM-12 in the presence of tetraethyl ammonium cations. Other prior art teaches that primary amines such as propylamine and i-propylamine (U.S. Pat. No. 4,151,189), and diamines such as diaminopentane, diaminohexane and diaminododecane (U.S. Pat. No. 4,108, 881) also direct the synthesis of ZSM-5 type structure. Hearmon et al (Zeolites, Vol. 10, 608 –611, (1990)) however, point out that the protonated form of the template molecule is most likely responsible for the framework assembly.

Thus the synthesis and characterization of mesoporous molecular sieves, high surface area metal oxides (800 to 1400 $m^2g^{-1}$) with uniform pore sizes (20 to 100 Å in diameter), have in recent years commanded much attention in the field of materials chemistry (Kresge, C. T., et al., 359, 710 (1992); Monnier, A., et al., Science, 261, 1299 (1993); Tanev, P. T., et al., Science 267, 865 (1995); Tanev, P. T., et al., Chem. Mater. 8, 2068 (1996); Bagshaw, S. A., et al., Science, 269, 1242 (1995); and Prouzet, E., et al., Angew.

Chem. Int. Ed. Eng. 36, 516 (1997). These materials can be prepared by the assembly and subsequent co-condensation of metal oxide precursor molecules (such as TEOS, Si(OEt)$_4$) around structure directing micelles consisting of surfactant molecules which can be either charged (such as alkyltrimethylammonium ions (Kresge, C. T., et al., Nature, 359, 710 (1992); and Monnier, A., et al., Science, 261, 1299 (1993)) or electrically neutral (such as primary alkylamines (Prouzet, E., et al., Angew. Chem. Int. Ed. Eng. 36, 516 (1997); Brunel, D., et al., Stud. Surf. Sci. Catal. 97, 173 (1995); and U.S. Patent No. 5,622,684 to Pinnavaia et al).

Focus has recently been put on researching methods to functionalize these materials in order to make mesostructured oxides useful for chemical applications. The chemical modification of mesoporous molecular sieves was first achieved by the incorporation or grafting of suitable moieties onto the surface of a preformed mesostructured oxide (Brunel, D., et al., Stud. Surf. Sci. Catal. 97, 173 (1995); and Cauvel, A., et al., AIP Conf. Proc. 354–477 (1996)), producing highly effective adsorbents (Mercier, L., et al., Adv. Mater. 9, 500 (1997); and Feng, X., et al., Science 276, 923 (1997)) and catalysts (Tanev, P. T., et al., Nature 368, 321 (1994); and Maschmeyer, T., et al., Nature 378, 159 (1995)). U.S. Patent Nos. 5,446,182 and 5,318,846 to Bruening et al describe various silane compounds with a liquid covalently bonded through an organic space to a solid support. The silane compounds disclosed in these patents can be starting materials for the compounds of the present invention and they are incorporated by reference herein. All of these compounds are "hydrolyzable" organic silicon alkoxides, commonly referred to as "silanes". The patents describe them in reactions with preformed solid substrates (silica gel, for instance). In this instance the silicon compound is grafted to the surface of the substrate rather than an integral part of the matrix. An alternate synthetic strategy was subsequently reported in which functional organic groups were directly incorporated into the mesostructures by a one-step process involving the co-condensation of tetraethoxysilane (TEOS) and organosilane (Si(OEt)$_3$R, where R is a functionalized organic group) in the presence of structure-directing alkyltrimethylammonium surfactant micelles (Burkett, S. L., et al., J. Chem. Soc. Chem. Commun. 1367 (1996); Fowler, C. E., et al., J. Chem. Soc. Chem. Commun. 1769 (1997); Lim, M. H., et al., Chem. Mater. 10, 467 (1998); Van Rhijn, W. M., et al., J. Chem. Soc., Chem. Commun. 317 (1998)). This technique appears to be a convenient improvement over post-synthesis functionalization because the preparation of ordered porous materials with controlled chemical composition can be achieved by adjusting the stoichiometry of the synthesis mixture. Since charge-bearing ammonium surfactants are used as structure-directing agents in this technique, an acid leaching technique was required to remove the surfactant (by ion-exchange) from the electrically charged frameworks, the result of which sometimes leading to the structural decomposition of the materials (Burkett, S. L., et al., J. Chem. Soc. Chem. Commun. 1367 (1996)). By using a non-electrostatic assembly strategy to prepare such functionalized mesostructures, the resulting frameworks would be electrostatically neutral, allowing the removal of the structure-directing surfactant by simple solvent extraction. Such an approach was demonstrated by Macquarrie for the preparation of ordered hybrid organic-inorganic silicas, in which a charge-neutral surfactant (dodecylamine) was used to assemble the mesostructures, then extracted out of the pore channels using hot ethanol (Macquarrie, D. J., J. Chem. Soc., Chem. Commun. 1961–1962 (1996)).

There is a need for improvements in the preparation of organic-inorganic metal oxide compositions which in particular are active for metal binding. The prior art structures are difficult to synthesize or have pores which are especially useful for metal binding.

OBJECTS OF THE INVENTION

It is therefore an object of the present invention to provide a new approach to the design and synthesis of mixed porous inorganic and organic metal oxide compositions with well defined mesoporosity, and controlled elementary particle size. Further, it is an object of the present invention to provide inexpensive templates, precursors and methods. Further, it is an object of the present invention to provide a template system that allows for facile recovery and thereby recycling of the template from the condensed organic-inorganic structure via solvent extraction. Further, it is an object of the present invention to provide a template system that affords mesoporous materials through lower cost, lower toxicity than either quaternary ammonium or amine surfactants and template biodegradability. It is a further object of the present invention to provide for the preparation of functionalized non-layered mesoporous structures of inorganic-organic oxide materials. Yet another objective is to provide for non-layered mesoporous structures of inorganic oxide materials derived from metals other than silicon, that are not accessible through the prior art. These and other objects will become increasingly apparent by reference to the following description and the drawings.

SUMMARY OF THE INVENTION

The present invention relates to a synthetic, semi-crystalline inorganic oxide composition prepared by a method comprising reacting an inorganic oxide precursor and a hydrolyzable organic silane in the presence of water and a structure-directing template which comprises a poly(oxyalkylene) based surfactant having a hydrophobic and hydrophilic moiety, the composition having at least one resolved x-ray reflection corresponding to a lattice spacing of 3 to 40 nm, framework confined pores between about 1 and 35 nm, and a surface area between 100 and 1500 m$^2$/gm and with the hydrolyzed organic silane moiety incorporated into the framework pore walls. The organic functional groups of the inorganic-organic oxide materials allow their use as adsorbents for the removal of organics from water, as trapping agents for the removal of toxic metal ions from water, as immobilized acids or bases and as heterogeneous catalysts for a wide range of organic reactions.

The present invention also relates to a method for the preparation of a synthetic, semi-crystalline hybrid organic-inorganic silicon oxide composition which comprises:

(a) providing a mixture of (i) a silicon oxide precursor; (ii) a neutral polymeric surfactant which comprises poly(oxyalkylene) polymer as a template having a hydrophobic and a hydrophilic moiety; and (iii) a hydrolyzable organic alkoxy silane;

(b) mixing the solution to form a precipitated composition in the presence of a solvent comprising water; and (c) removing the surfactant from the precipitated composition by solvent extraction to form the organic-inorganic silicon oxide composition.

The silane compound used in preparing the compositions has the formula:

where n=1, 2 or 3. Compounds where X is 1 are preferred. X can be an alkoxide or a halide.

The anhydrous oxide is represented by the formula where $SiO_{1.0}R_{2.0}$ is a hydrolyzed organic silane moiety incorporated into the framework, Si is a silicon atom, O is oxygen and x is between 0.01 and 0.25.

The initial inorganic oxide precursor can be an alkoxide, a halide or a 1,3-diketonate. Preferred is the alkoxide. The hydrolyzable organic silane provides the hydrolyzed organic silane, organic groups which are a sulfur containing ligand moiety.

DESCRIPTION OF PREFERRED EMBODIMENTS

The terms framework-confined and textural porosity are herein defined. Framework-confined uniform pores are pores formed by the nucleation and crystallization of the framework elementary particles and are typically highly regular cavities and channels confined by the solid framework. The size of these cavities and channels is predetermined by the thermodynamically favored assembly routes. Textural porosity is that which can be attributed to voids and channels between elementary particles and/or aggregates of such particles (grains) Each elementary particle in the case of molecular sieves is composed of a certain number of framework unit cells each in turn containing framework-confined uniform pores. Textural porosity is formed during crystal growth and segregation or during subsequent thermal treatment or acid leaching. The size of the textural pores is determined by the size, shape and the number of interfacial contacts of these particles or aggregates. Thus, the size of the textural pores is generally one or two orders of magnitude larger than that of the framework-confined pores and is proportional to the elementary particle size.

One skilled in the arts of powder X-ray diffraction (XRD), Scanning Electron Microscopy (SEM), Transmission Electron Microscopy (TEM) and adsorption/desorption can determine the existence of and differentiate between framework-confined and textural mesoporosities. The crystallographic distance between repeat units in the elementary particles and some information about the arrangement of such repeat units can be obtained from XRD. Particle sizes and shapes and preliminary information regarding textural mesoporosity can be established by SEM and TEM. Analysis of the $N_2$ or Ar adsorption-desorption isotherms of the solid material can indicate both framework-confined and textural mesoporosities. Textural mesoporosity is evidenced by the presence of a Type IV isotherm exhibiting a well defined hysteresis loop in the relative pressure region $P_i/P_0>0.5$ (Sing et al., Pure Appl. Chem., Vol. 57, 603–619, (1985)). This behavior is common for a variety of paracrystalline materials and freeze-dried pillared layered solids. Framework-confined mesoporosity is characterized by a sharp adsorption uptake followed by a hysteresis loop in the 0.3–0.4 $P_i/P_0$ region. This hysteresis corresponds to capillary condensation in the framework-confined mesopores.

The present invention provides a new route to the synthesis of organic-inorganic metal oxide compositions with well defined framework-confined mesopores and large elementary particle size. The compositions produced in the current invention are distinguished from those of the prior art by the virtue of the method of preparation of the present invention, the subsequent architecture of the mesoporous structure and the range of templated organic-substituted metal oxides other than silica that is afforded by this route. Formation of the mesoporous network is accomplished by interaction (complexation and/or hydrogen-bonding) between a nonionic poly(oxyalkylene)polymer based surfactant template and neutral inorganic and organic precursors, followed by hydrolysis and subsequent condensation of the inorganic reaction product under either ambient or elevated temperature reaction conditions and the subsequent removal of the solvent phase and the template. The compositions also have textural mesoporosity.

The present invention particularly provides a preferred nonionic route to the preparation of quasi-crystalline inorganic-organic oxide compositions comprising (a) preparing a homogeneous solution or emulsion of a nonionic poly(oxyalkylene)polymer surfactant by stirring, sonicating or shaking at standard temperature and pressure (STP); (b) addition of one or more of each of neutral inorganic and organic precursors with stirring at standard temperatures and pressures (STP) to the emulsion of step (a) at ambient temperature to form a precipitated semi-crystalline product; (c) separating the solvent and the hydrolyzing agent from the precipitated product by filtration or centrifugation; and (d) extracting the template through solvent extraction whereby the solvent is either water or ethanol.

The present invention thus provides a new route to inorganic and organic oxide crystalline materials with uniform well defined framework-confined mesopores and controlled elementary particle size that can be utilized as adsorbents, metal ion traps, solid acids and bases, and catalysts and catalyst supports for the catalytic conversion of organic substrates. According to the method of the present invention, the formation of the mesoporous structure is accomplished by interaction (complexation and/or hydrogen bonding) between template molecules within micellar aggregates of nonionic poly(oxyalkylene) polymer templates and neutral organic and inorganic oxide precursors, followed by hydrolysis and cross linking of $IO_x$ units, where I is a central metallic or non-metallic element coordinated to x oxygen atoms ($2 \leq x \leq 6$). This interaction is most likely to occur between an I-OH unit and the terminal OH function of each surfactant molecule, or between the I-OH unit and the array of lone pair electrons on the template polar segment. The polar segment of the template in the present invention is flexible and appears to act in the fashion of a crown ether complexing a I-OH unit, thereby stabilizing a site of nucleation for subsequent condensation of the mesoporous quasi-crystalline organic and inorganic oxide product, although the inventors do not want to be bound to any particular theory.

The prior art does not describe the preparation of micro-, meso-, or macro-porous inorganic oxide compositions by such a nonionic mechanism involving crystallization of organic and inorganic oxide precursors around well defined micelles of nonionic polymeric surfactants. Specifically, the present result is achieved by using micelles of a nonionic surfactant to template and assemble neutral inorganic and organic reactant precursors into a mesoporous framework structure. Complexation and/or hydrogen bonding between the template and the reagent is believed to be the primary driving force of the assembly of the framework in the current invention. The aforementioned method consists of the formation of a solid precipitate by the mixing of a solution or emulsion of a poly(oxyalkylene) based polymer, nonionic surfactant, with a neutral inorganic, usually inorganic alkoxide, and an organic oxide precursor in the presence of a hydrolyzing agent, followed by aging and crystallization under stirring, sonication or shaking at ambient temperature for at least 16 h. The template may be recovered by extraction with ambient temperature alcohol or hot water whose temperature exceeds the cloud point of the template.

The molar ratio of inorganic and organic oxide precursor to surfactant is between 10:1 and 20:1 depending upon the specific template being used. The concentration of surfactant in solution is between 0.003 mol $L^{-1}$ and 0.4 mol $L^{-1}$ again depending upon the surfactant being used and the pore size desired. The crystalline inorganic-organic oxide composition of the present invention upon removal of the template has the preferred composition:

$(R_1Me)_xMe\ 1-x\ O_2$ wherein Me is at least one metal such as Al, Ga or Fe; or Ge, Ti, V, Sb or Zr; W or Mo; wherein at least some of Me are Si which is derived from an organic alkoxy silane, $R_1$ is the organic group; O is oxygen and x is the molar stoichiometry of Me between about 0.001 and 0.999, respectively. The product can be hydrated. The mole ratio of hydrolyzed organic silane to Me is between about 0.01 and 0.25.

Preferably, the method comprises the formation of an organic/inorganic solution by the mixing of an aqueous or alcoholic solution of nonionic surfactant with the desired amount of Si-alkoxide, Me-Si double alkoxide, mixtures of Si- and Me-alkoxides or pure Me alkoxides (where Me=Al, Ca, Cr, Fe, Ga, Ge, Mg, Mo, Nb, Sb, Sn, Ti, V, W, or Zr) and organic alkoxy silane, followed by aging and subsequent precipitation under stirring for at least 16 h. The template is preferably a nonionic (neutral) polyethylene oxide based molecule that possesses one of many different molecular structures and the hydrolyzing agent is preferably water.

The template may be removed from the condensed reaction products by solvent extraction of the template from the air dried material using an organic solvent such as an alcohol or using hot water.

Figure 3:
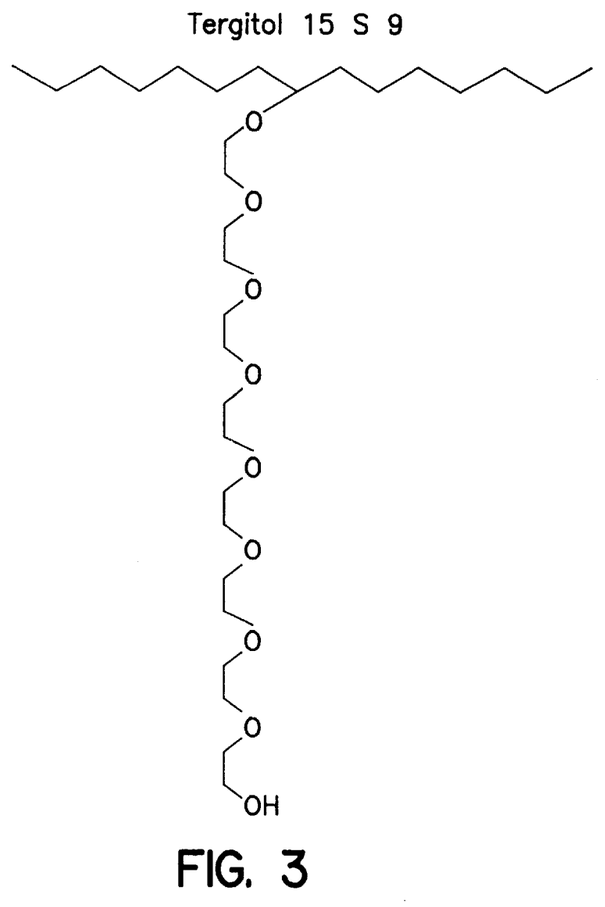
FIG. 3 is a representative chemical structure of a secondary fatty alcohol poly-ethoxylate (TERGITOL).

The new synthesis method involves the preparation of solutions or emulsions of a surfactant template compound and reaction of this solution with liquid di-, tri-, tetra-, penta- or hexa-valent metal or metalloid hydrolyzable reagents including an organic silane in the presence of a hydrolysing agent under stirring, sonication or shaking, until formation of the desired precipitated product is achieved and recovering the solid material. There are four basic types of preferred surfactant molecules that are described herein. The alkyl-polyethylene oxides; such as are related to the Tergitol 15-S-m products (FIG. 3) are derived from the reaction of ethylene oxide with a primary or secondary alcohol and possess the basic formula $R_n$—$O(EO)_mH$ where R is a hydrophobic alkyl group with n ranging from 1 to at least 20 carbon atoms, EO is a hydrophilic ethylene oxide unit ($OCH_2CH_2$) with m ranging from about 7 to 40, preferably at least 20.

Figure 4A:
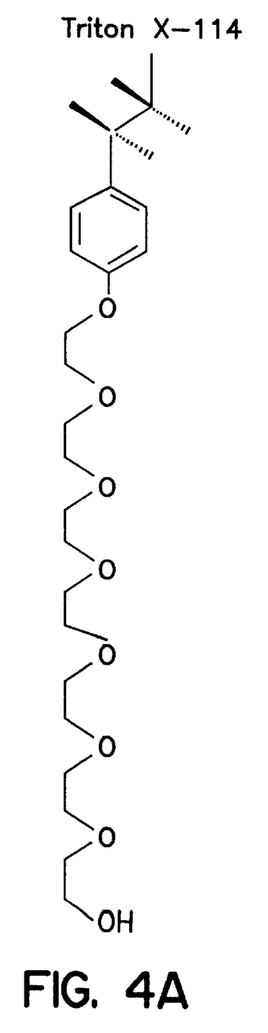
FIG. 4A is a representative chemical structure of an alkyl phenol poly-ethoxylate (TRITON X™).
Figure 4B:
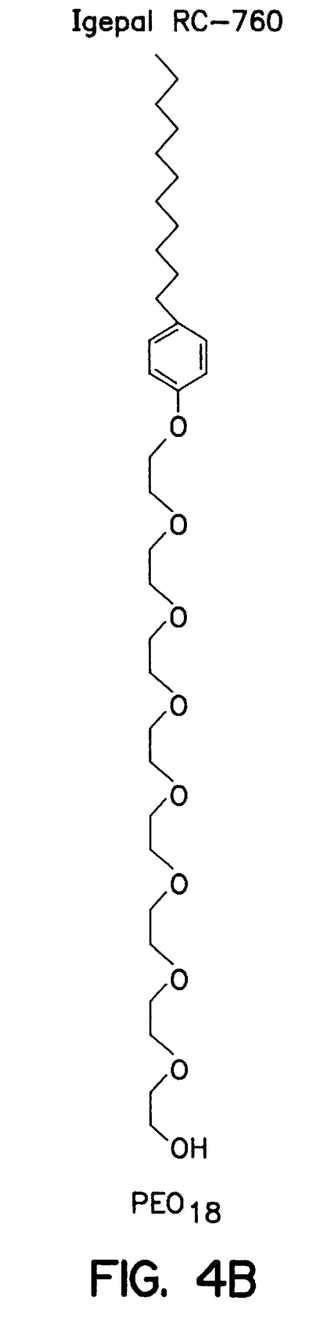
FIG. 4B is IGEPAL RC-760.

The alkyl-phenyl polyethylene oxides; such as IGEPAL-RC (FIG. 4B), BRIJ and TRITON-X (FIG. 4A), possess the same range of structures as the alkyl-polyethylene oxides, with the exception that the primary (IGEPAL RC), secondary or tertiary (TRITON X) R group is bound to the EO units through a hydrophobic phenoxy group (PhO). These molecules then, have the basic formula; $R_n$—Ph—$O(EO)_mH$, preferably where m is 8 to 10 and n is 8.

Figure 6:
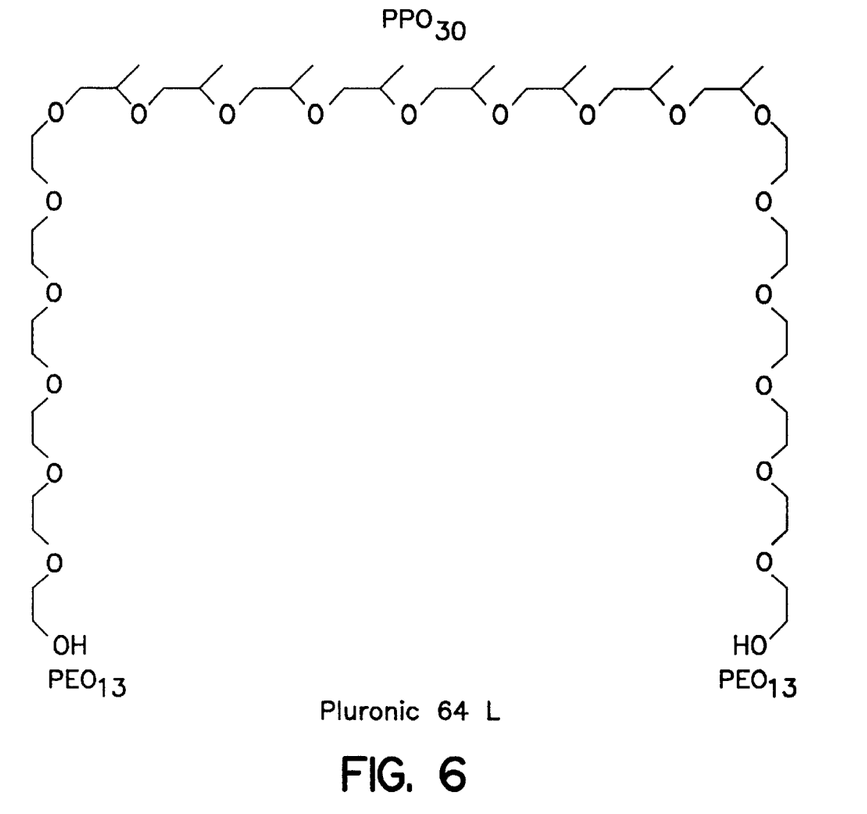
FIG. 6 is a representative chemical structure of an ethylene oxide-propylene oxide-ethylene oxide tri-block co-polymer (PLURONIC 64L™).

The polyethylene oxide (PEO)-polypropylene oxide (PPO) molecules; such as Pluronic (FIG. 6), are derived from the addition of hydrophobic propylene oxide to propylene glycol followed by the addition of hydrophilic ethylene oxide. They are defined as $PEO_n$—$PPO_m$—$PEO_n$ tri-block co-polymers wherein n is controlled by length to constitute from 10% to 80% by weight of the final product. The order of the PEO and PPO units may be reversed in order to produce the $PPO_m$—$PEO_n$—$PPO_m$ triblock co-polymers; Pluronic-R. Preferably n is 30 and m is 13.

Figure 5:
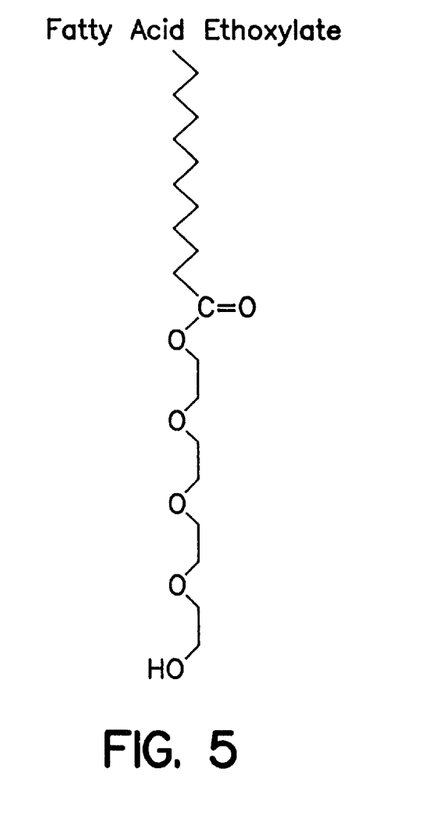
FIG. 5 is a representative chemical structure of a fatty acid ethoxylate.
Figure 7:
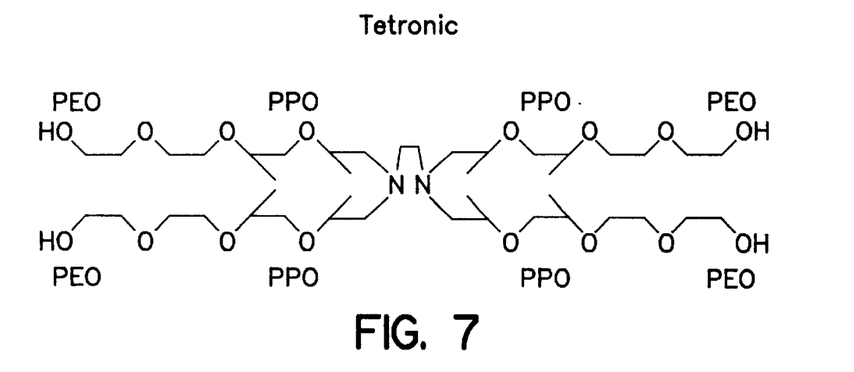
FIG. 7 is a representative chemical structure of the ethylene diamine propylene oxide-ethylene oxide derivative (TETRONIC).
Figures 8, 9:
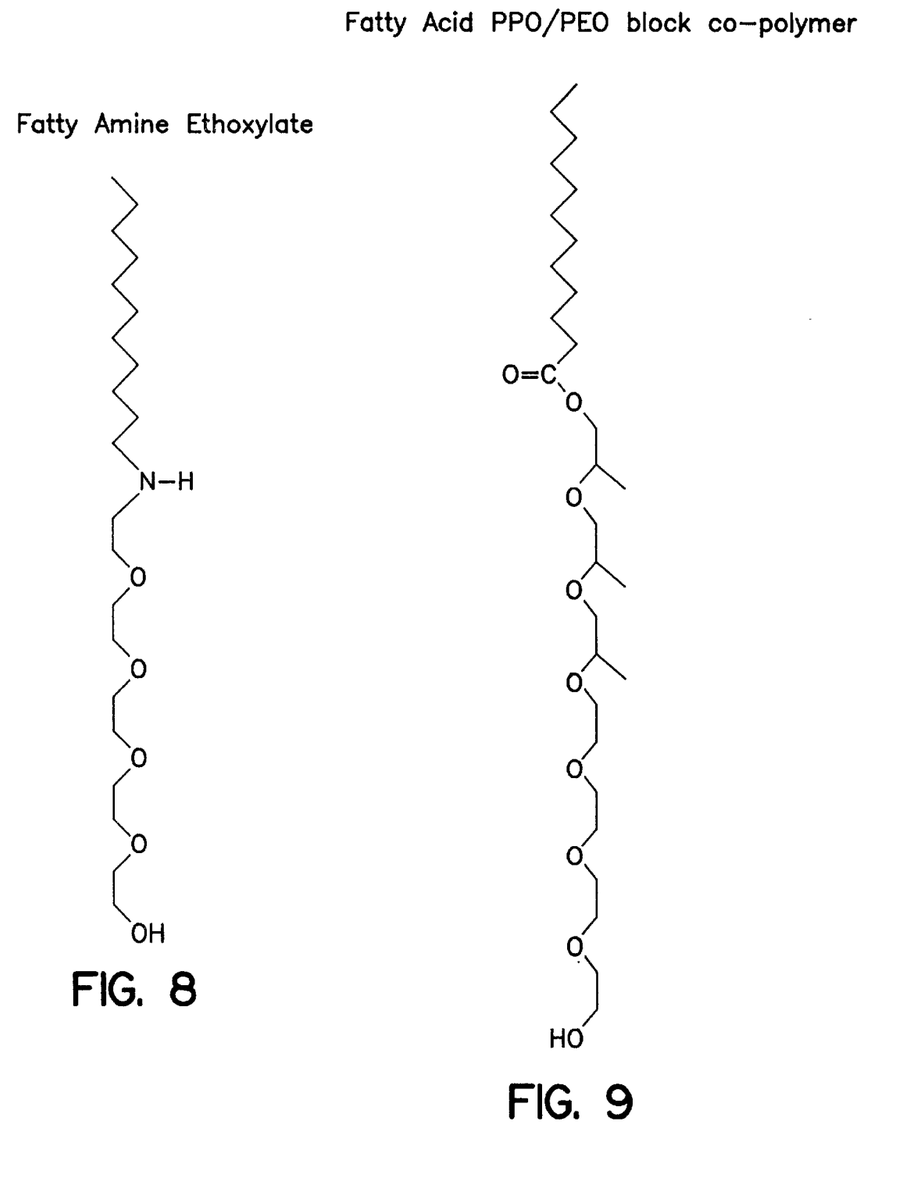
FIG. 8 is a representative chemical structure of a primary fatty amine poly-ethoxylate.
FIG. 9 is a representative chemical structure of a fatty acid PPO/PEO block co-polymer.
Figure 10:
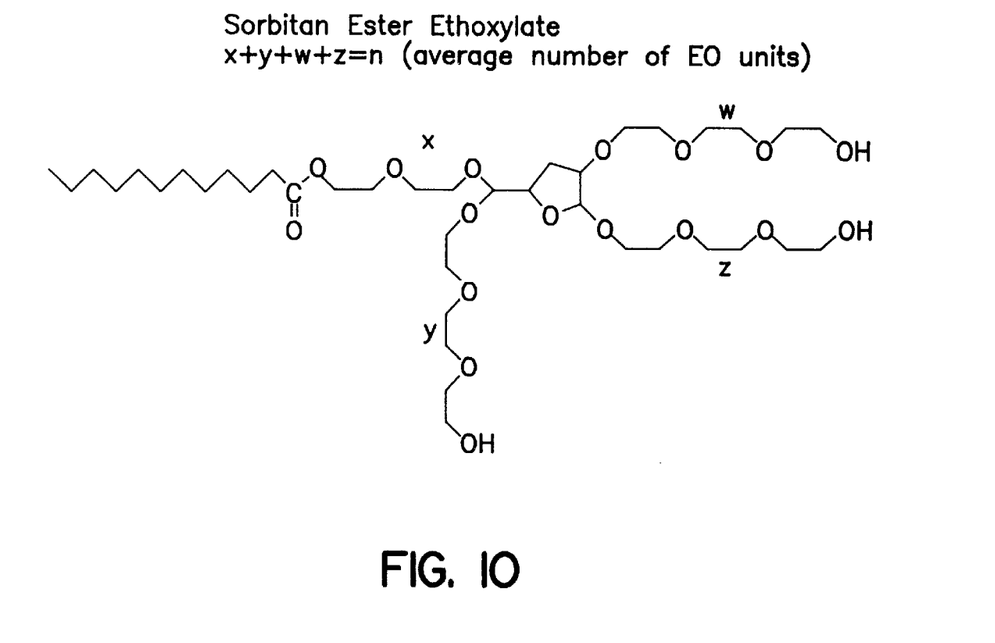
FIG. 10 is a representative chemical structure of a sorbitan ethoxylate.

A fourth basic PEO based surfactant type is derived by from the substitution of the hydrogens of ethylene diamine by ethylene oxide and propylene oxide units to form the X shaped, Tetronic, molecules (FIG. 7) with basic formula; $((EO)_n$—$(PO)_m)_2$—$NCH_2CH_2N$—$((PO)_m$—$(EO)_n)_2$. The order of the PEO and PPO groups in these molecules may also be reversed to form Tetronic-R. Preferably m is 13 and n is 30. FIGS. 5, 8 and 9 show other useful polymers.

The preferred preparation procedures of the said compositions comprise steps as follows:

(i) preparing a solution of the desired template under stirring, in a solvent that is either water for the preparation of silicon dioxide, or alcohol for the preparation of metal oxide compositions from more reactive alkoxide precursors;

(ii) addition of the desired metal oxide precursor(s) and one or more organic alkoxy silane(s) to the surfactant solution under stirring, sonication or shaking. The metal oxide precursor(s) and organic alkoxy silane(s) can be added simultaneously or in any order to the template solution;

(iii) preparation of a solution of the hydrolysing agent in the alcohol used in step (i). The hydrolysing agent is water;

(iv) very slow addition of the hydrolysing agent to the template/inorganic-organic precursor solution under stirring. (iii and iv) are not required if templated silica is being prepared);

(v) aging of the total solution for at least 16 h up to 48 h at room temperature;

(vi) separation of the product from the supernatant liquid by filtration or centrifugation;

(vii) air drying of the product followed by optional heat treatment at 373° K.; and (viii) separation of the template by extraction with an organic solvent, a mixture of solvents, or hot water or a mixture thereof. The preferred extraction solvent is ethanol.

The inorganic oxide precursors are single or double metal alkoxide compounds, The list of preferred alkoxides includes but not exclusively: aluminum(III) ethoxide, aluminum(III) isopropoxide, aluminum(III) n-, sec- or tert-butoxide, antimony(III) isopropoxide, antimony(III) n-butoxide, calcium(II) ethoxide, calcium(II) isopropoxide, calcium(II) tert-butoxide, chromium(IV) isopropoxide, chromium(IV) tert-butoxide, copper(II) methoxyethoxide, gallium(III) isopropoxide, germanium(IV) ethoxide, germanium(IV) isopropoxide, indium(III) isopropoxide, iron(III) ethoxide, iron(III) isopropoxide, iron(III) tert-butoxide, lead(II) isopropoxide, lead(II) tert-butoxide, magnesium(II) ethoxide, manganese (II) isopropoxide, molybdenum(V) isopropoxide, niobium(V) ethoxide, silicon(IV) methoxide, silicon(IV) ethoxide, silicon(IV) propoxide, silicon(IV) butoxide, silicon(IV) hexoxide, strontium(II) ethoxide, tin(IV) isopropoxide, titanium(IV) ethoxide, titanium(IV) propoxide, titanium(IV) isopropoxide, titanium(IV) butoxide, titanium(IV) octadecoxide, tungsten(VI) ethoxide, tungsten(VI) isopropoxide, vanadium(V) triisopropoxide oxide, zinc(II) isopropoxide, zinc(II) tert-butoxide, zirconium(IV) n-propoxide, zirconium(IV) isopropoxide, zirconium(IV) butoxide, zirconium(IV) tert-butoxide, aluminum (III) silicon (IV) alkoxide , titanium(IV)silicon(IV) polyethoxide and other mixtures of the aforementioned alkoxide compounds. The alcohols used in step (i) of the preparation art correspond to the alcoholate ligand from which the metal alkoxide is derived. The alcohols thus preferred are methanol, ethanol, n- and isopropanol and n-, sect, tert-, butanol. The alcohols contain 1 to 4 carbon atoms.

The organic silanes which are useful are those which will react to form the mesoporous structure. Included are preferred silanes of the formula:

(RO)$_3$SiR$_1$ where R is a lower alkyl group (1 to 8 carbon atoms) and R$_1$ can be an organic group which can be an alkyl, alkoxy, alkenyl or alkynyl, cycloaliphatic, aromatic group containing 1 to 25 carbon atoms. R$_1$ can include substituents of O, N or S and can provide a hydroxide, an aldehyde, acid, base, sulfide, cyanide, mercaptan and the like. Examples of basic moieties especially useful as catalysts include amines and pyridyl groups. Useful acidic functionalities include carboxylic acids, sulfonic acids, and furoinated sulfonic acids. R$_1$ can contain a halogen selected from the group consisting of F, I, Br or Cl and the R$_1$ group can be further reacted at the halogen group. The preferred R$_1$ contain moieties which are metal binding to provide selective adsorption of metal ions from solution. Especially useful metal trapping agents include organic groups containing chelating ligands such as ethylene diamines, ethylene diamine tri- and tetra acetate, cyclic and bicyclic polyethers known as crown ethers and cryptans and the like. The mixed metal alkoxides and organic-alkoxy silanes can be obtained commercially. Alternatively, they may be specifically prepared for use in forming the desired compositions. For instance, desired mixed metal alkoxides may be prepared by reaction of the parent alkoxides in desired molar ratios under reflux for 3–4 hours. Functional organosilanes can be prepared by hydrosilylation of olefins.

Other preferred silanes are of the class RO$_2$Si(R$_2$)$_2$ where R$_2$ can be the same as R$_1$. The general formula is Si(OR)$_{4-n}$(R)$_n$ where n is 1, 2 or 3. Preferably R$_1$ or R$_2$ contains a functional group selected from a metal, vinyl, cyano, amino, mercapto, halogen (usually Cl or Br), aldehyde, ketone acid (including sulfuric and F-sulfuric acid or base group). The metals help form structures where the metal is removable and provides increased receptivity to the metal removed. Preferably R$_1$ or R$_2$ is a functional group.

Examples of commercially available functional silanes which can be used are:

3- (N-allylamino)propyltrimethoxy-silane;

O-allyloxy(polyethyleneoxy)-trimethylsilane;

N-(2-aminoethyl)-3-aminopropylmethyl-dimethoxysilane;

N-(2-aminoethyl)-3-aminopropyltri-methoxysilane N-[3-(trimethoxysilyl)propyl]ethylenediamine;

N-(6-aminohexyl)aminopropyl-trimethoxysilane;

2- [Methoxy(polyethyleneoxy)propyl]trimethoxysilane;

(3-Trimethoxysilylpropyl)diethylene-triamine 95%;

Trivinylmethoxysilane;

3-Cyanopropyldimethylmethoxysilane;

3-Cyanopropyltriethoxysilane;

(3-Cyclopentadienylpropyl)triethoxysilane;

Diphenyldiethoxysilane;

Diphenyldimethoxysilane;

Diphenylsilanediol;

Diphenylvinylethoxysilane;

(Mercaptomethyl)dimethylethoxysilane;

(Mercaptomethyl)methyldiethoxysilane;

3-Mercaptopropylmethyldimethoxysilane;

3-Mercaptopropyltrimethoxysilane;

3-Mercaptopropyltriethoxysilane;

3-Methacryloxypropyldimethylethoxy-silane;

3-Methacryloxypropyldimethylmethoxysilane;

3-Methacryloxypropylmethyldiethoxy-silane;

3-Methacryloxypropylmethyldimethoxysilane;

3-methacryloxypropyltrimethoxysilane;

Methylphenyldimethoxysilane;

Methyl [2-(3-trimethoxysilylpropylamino)-ethylamino]-3-propionate (65% in methanol);

7-Oct-1-enyltrimethoxysilane;

Phenethyltrimethoxysilane;

N-Phenylaminopropyltrimethoxysilane;

Phenyldimethylethoxysilane;

Phenyltriethoxysilane;

Phenyltrimethoxysilane;

Phenylvinyldiethoxysilane;

N-[3-(triethoxysilyl)propyl]-4,5-dihydro-imidazole;

2-(Trimethoxysilyl)ethyl-2-Pyridine;

Trimethoxysilylpropyldiethylenetriamine (95%);

N[(3-trimethoxysilyl)propyl]ethylene-diamine triacetic acid, trisodium salt (50% in water)

N-(3-trimethoxysilylpropyl)pyrrole;

Triphenylsilanol;

Vinyldimethylethoxysilane;
Vinylmethyldiethoxysilane;
Vinyltriethoxysilane;
Vinyltrimethoxysilane;
3-Cyanopropyldimethylmethoxysilane;
3-Cyanopropyltriethoxysilane;
(3-Cyclopentadienylpropyl)triethoxysilane;
Diphenyldimethoxysilane;
Diphenylsilanediol;
Diphenylvinylethoxysilane;
(Mercaptomethyl)dimethylethoxysilane;
(Mercaptomethyl)methyldiethoxysilane;
3-Mercaptopropylmethyldimethoxysilane;
3-Mercaptopropyltrimethoxysilane;
3-Mercaptopropyltriethoxysilane;
3-Methacryloxypropyldimethylethoxy-silane;
3-methacryloxypropyldimethylmethoxysilane;
3-Methacryloxyproopylmethyldiethoxy-silane;
3-Methacryloxypropylmethyldimethoxysilane;
3-Methacryloxypropyltrimethyoxysilane;
Methylphenyldimethoxysilane;
Methyl [2-(3-trimethoxysilylpropylamino)-ethylamine]-3-propionate (65% in methano);
7-Oct-1–3nyltrimethoxysilane;
Phenethyltrimethoxysilane;
N-phenylaminopropyltrimethoxysilane;
Phenyldimethylethoxysilane;
Phenyltriethoxysilane;
Phenyltrimethoxysilane;
Phenylvinyldiethoxysilane;
N-[3-(triethoxysilyl)propyl]-4,5-dihydro-imidazole;
2-(Trimethoxysilyl)ethyl-2-pyridine;
Trimethoxysilylpropyldiethylenetriamine (95%);
N-[(3-trimethoxysilyl)propyl]ethylene-diamine triacetic acid, trisodium salt (50% in water)
N-(3-trimethoxysilylpropyl)pyrrole;
Triphenylsilanol;
Vinyldimethylethoxysilane;
Vinylmethyldiethoxysilane;
Vinyltriethoxysilane;
Vinyltrimethoxysilane.
N-(trimethoxysilylpropyl)ethylene-diamine, triacetic acid, trisodium salt;
4-Aminobutyldimethylmethoxysilane;
4-Aminobutyltriethoxysilane (95%);
N-(2-aminoethyl)-3-aminopropylmethyldimethoxysilane;
$H_2NCH_2CH_2CH_2SiOEt$
3-aminopropyldimethylethoxysilane;
3-Aminopropylmethyldiethoxysilane;
3-Aminopropyldiisopropylethoxysilane;
3-Aminopropyltriethoxysilane;
3-Aminopropyltrimethoxysilane;
N-(triethoxysilylpropyl)urea (50% in methanol).
N-[3-(triethoxysilyl)propyl]phthalamic acid (95%).

The above list is not meant to be limiting, but merely intended to provide examples of easily obtainable functional silanes useful in preparing the compositions of this invention. In general, any functional organosilane may be incorporated into the porous inorganic and organic oxide materials embraced by the present art. Functional organo groups on the silane moiety that are especially useful include acids and bases for catalytic applications, dye chromophores for sensing, and complexants for binding metal ions. In the latter case the bound metal ions may be recovered by ion exchange or subsequently used in the immobilized state as catalysts for organic chemical transformation.

The reaction of the inorganic precursor, organic precursor and the template solution is preferably achieved between 10° C. and 80° C. under stirring for periods between 0.5 and 16 hours. The pH can be acidic, basic, or neutral, but near-neutral pH values are preferred. With co-surfactants such as mesitylene or xylenes the templating micelles may be swelled to produce increased pore sizes. Other non-polar solvents can be used for this purpose.

Aging of the reaction mixture may be achieved at room temperature either under stirring, sonication or shaking or by being left to stand for at least 24 h. More specifically, the reacting occurs through complexation or H-bonding between a neutral nonionic template and neutral inorganic oxide precursors, followed by hydrolysis and crosslinking of $IO_x$ units at ambient or elevated reaction temperatures. The complexation, or H-bonding most likely occurs between the terminal OH group of the template molecules and the hydrolyzable ligand on the inorganic and organic precursor molecules, or between the inorganic and organic precursor molecules and the electron lone pairs of the ethylene oxide groups in the hydrophilic head group of the template molecules.

The templated inorganic-organic oxide compositions of the present invention can be combined with other components, for example, zeolites, clays, inorganic oxides or organic polymers or mixtures thereof. In this way adsorbents, ion-exchangers, catalysts, catalyst supports or composite materials with a wide variety of properties may be prepared. Additionally, one skilled in the art may impregnate or encapsulate transition metal macrocyclic molecules such as porphyrins or phthalocyanines containing a wide variety of catalytically active metal centers.

Additionally, the surfaces of the compositions can be functionalized in order to produce catalytic, hydrophilic or hydrophobic surfaces. The surfaces may be functionalized after synthesis by reaction with various chlorides, fluorides, silylating or alkylating reagents.

The following are specific examples of the present invention intended to illustrate but not to limit the invention.

The following Examples show the co-condensation of tetraethoxysilane (TEOS) and organotrialkoxysilane $(RO)_3SiR_1$ assembled in the presence of structure-directing non-ionic polyethyleneoxide surfactant micelles provides a convenient neutral pH synthesis methodology for the one-step preparation of organically functionalized mesostructured materials.

In particular the examples show preparation of organically functionalized mesoporous molecular sieves using uncharged non-ionic alkylpolyethyleneoxide surfactants as structure-directing agents, namely TERGITOL 15-S-12 $(CH_3(CH_2)_{14}(OCH_2CH_2)_{12}OH)$ and TRITON-X100 $((CH_3)_3C(CH_3)_2CCH_2C_6H_4(OCH_2CH_2)_{10}OH)$.

EXAMPLES 1 AND 2

The non-functionalized inorganic mesostructured silicas MSU-1 and MSU-2 were prepared according to previously published assembly techniques (Prouzet, E., et al., Angew. Chem. Int. Ed. Eng. 36, 516 (1997); U.S. Pat. No. 5,622, 684), using TERGITOL 15-S-12 and TRITON-X, respectively, as structure-directing surfactants. Functionalized derivatives of MSU-1 and MSU-2 (MP-MSU-1 and MP-MSU-2) were synthesized by stirring TEOS and mercaptopropyltrimethoxysilane (MPTMS) in solutions of TERGITOL 15-S-12 (0.02 mol L$^{-1}$) or TRITON-X100 (0.027 mol L$^{-1}$) until a clear mixture formed. The solutions were then transferred to a thermostated water bath set at 308 K and NaF was added to catalyze the condensation of the siloxane molecules (the molar composition of each mixture was 0.1 surfactant: 1−x TEOS: x MPTMS: 0.02 NaF, where x=0, 0.02 or 0.05). After aging for 24 hours, the resulting powders were filtered, air dried and the surfactants removed from the mesostructure pores by Soxhlet extraction over ethanol for 24 hours. The functionalized mesostructures assembled using TERGITOL-15-S-12 were thus labeled as MP-MSU-1-2% (x=0.02) and MP-MSU-1-5% (x=0.05), while those prepared from TRITON-X100 were designated as MP-MSU-2-2% (x=0.02) and MP-MSU-2-5% (x=0.05). The mesostructures were characterized by powder X-ray diffraction (XRD), $N_2$ sorptometry, elemental analysis (for S), $^{29}$Si MAS-NMR and scanning electron microscopy (SEM). The materials' physical properties obtained from these techniques are given in Table 1.

TABLE 1

| Sample | $d_{100}$ lattice spacing/ Å | BET surface area/ $m^2g^{-1}$ | Pore diameter/ Å[a] | S content/ mmol g$^{-1}$ | Organosilane content[b] |
|---|---|---|---|---|---|
| MSU-1 | 51 | 1225 | 32 | 0 | 0 |
| MP-MSU-1-2% | 50 | 943 | 26 | 0.40 | 2.6% |
| MP-MSU-1-5% | 48 | 858 | 22 | 0.87 | 5.8% |
| MSU-2 | 66 | 1018 | 41 | 0 | 0 |
| MP-MSU-2-2% | 50 | 1176 | 27 | 0.47 | 3.0% |
| MP-MSU-2-5% | 40 | 763 | — | 1.1 | 7.7% |

[a]Measured using the Horvath-Kawazoe pore size distribution model (Horvath, G., et al., J. Chem. Eng. Jap. 16, 470 (1983)).
[b]Percentage of Si atoms present as organosilane with respect to total Si content.

Figure 1A:
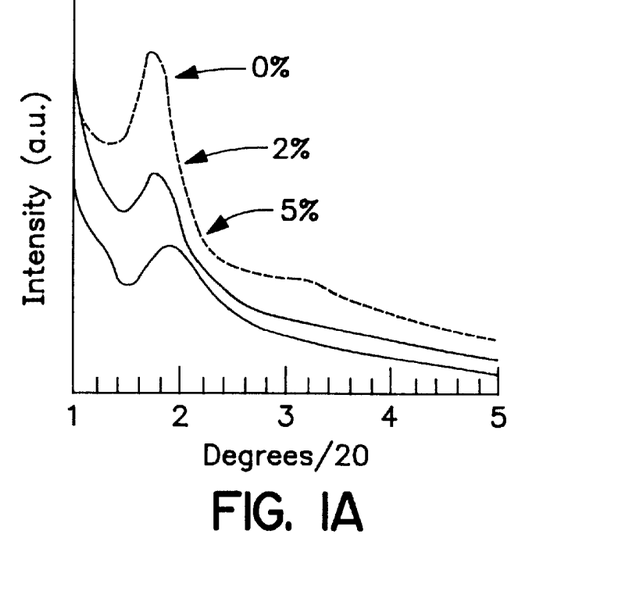
FIGS. 1A and 1B are graphs of powder patterns for (FIG. 1A) MSU-1 (inorganic) (dotted curve) and MP-MSU-1 (organic-inorganic) materials (solid curves); and for (FIG. 1B) MSU-2 (dotted curve) and MP-MSU-2 materials (solid curves). The percentages denote the mercaptopropylsilyl group substitution in the mesostructures synthesis mixtures.
Figure 1B:
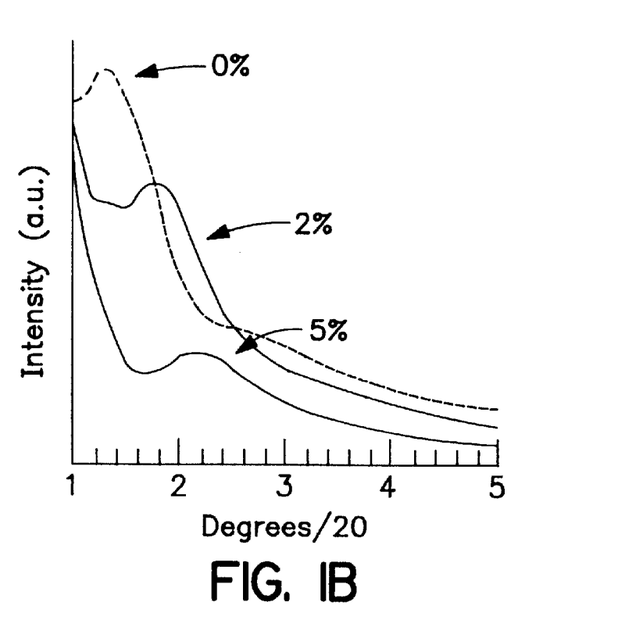

The low angle powder X-ray diffraction patterns of the MSU-1 and MSU-2 materials (FIG. 1) featured dominant first order ($d_{100}$) diffraction peaks (with d-spacings of 51 and 66 Å, respectively, see Table 1) and broad, low intensity second order ($d_{200}$) peaks at higher incidence angle. These represent features typical of ordered mesostructured oxides with "wormlike" pore channel structures, as expected of materials assembled using either neutral (Tanev, P. T., et al., Science 267, 865 (1995); and Tanev, P. T., et al. Chem. Mater. 8,2068 (1996)) or non-ionic surfactants (Bagshaw, S. A., et al., Science 269, 1242 (1995); and Prouzet, E., et al., Angew,. Chem. Int. Ed. Eng. 36, 516 (1997)). As organosilane moieties are incorporated into the mesostructures, the $d_{100}$ peaks of the materials become shifted to higher diffraction angles (FIG. 1), indicating progressive contractions of the lattice d-spacings upon functional group loading (Table 1) Although this effect is slight or the MP-MSU-1 mesostructures (a contraction of only 6% from MSU-1 to MP-MSU-1-5%), significant contraction of the MSU-2 lattice is observed (by 39% from MSU-2 to MP-MSU-2-5%) Moreover, the intensities of the (100) peaks for the functionalized materials were lower in intensity compared to their respective parent mesostructures, and the higher order (200) reflections are no longer detected. Both of these observations suggest that, although crystallographic order is maintained in the MP-incorporated materials, the addition of organosilane molecules to the mesostructure syntheses mixtures causes perturbation of the surfactant micelle structures in solution, giving rise to the assembly of materials with decreased crystallographic ordering. The relatively strong lyophilic interactions between the organosilane molecules and the hydrophobic core of the assembly micelles (particularly in the case of TRITON-X) are likely to result in the "diving" of the organosilane molecules to a greater depth within the micelle than do the TEOS molecules. This will cause the micelle structure to "open-up" and allow TEOS molecules to migrate deeper within the micelle, where they subsequently crosslink with the organosilane functionalities. The perturbations thus caused to the micelle organization thus results in the assembly of more disordered materials.

Figure 2A:
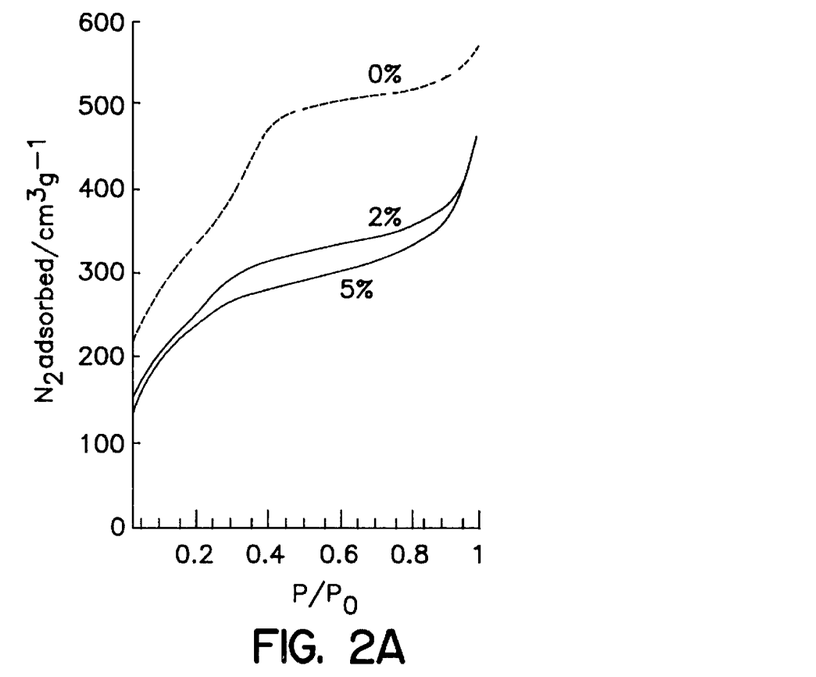
FIGS. 2A, 2B, 2C and 2D—Left: $N_2$ adsorption isotherms of (FIG. 2A) MSU-1 (dotted curve) and MP-MSU-1 materials (solid curves), and of (FIG. 2B) MSU-2 (dotted curve) and MP-MSU-2 materials (solid curves) Right: Background-subtracted Horvath-Kawazoe pore diameter (r) distributions of (FIG. 2C) MSU-1 (dotted curve) and MP-MSU-1 materials (solid curves), and of (FIG. 2D) MSU-2 (dotted curve) and MP-MSU-2 materials (solid curves).
Figure 2B:
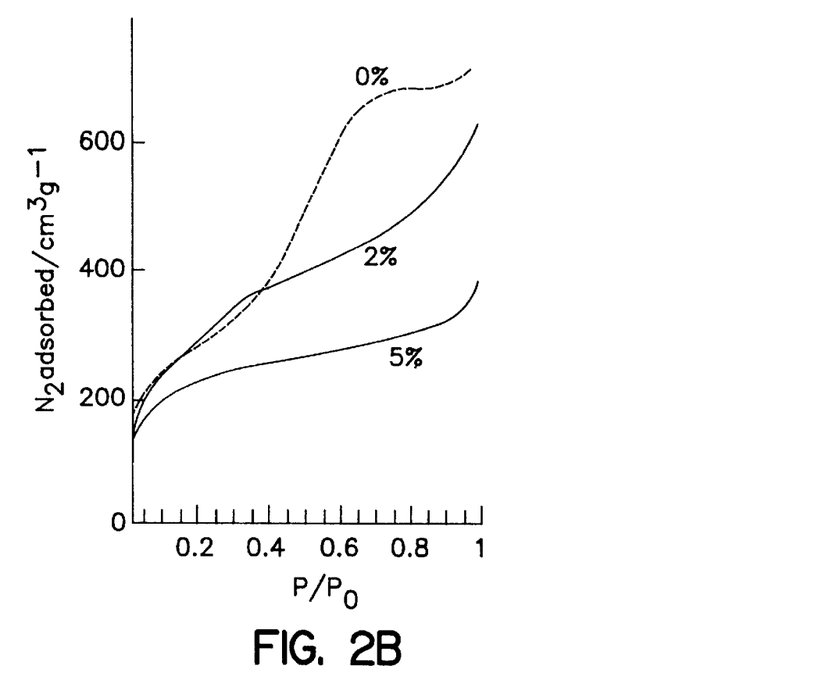
Figure 2C:
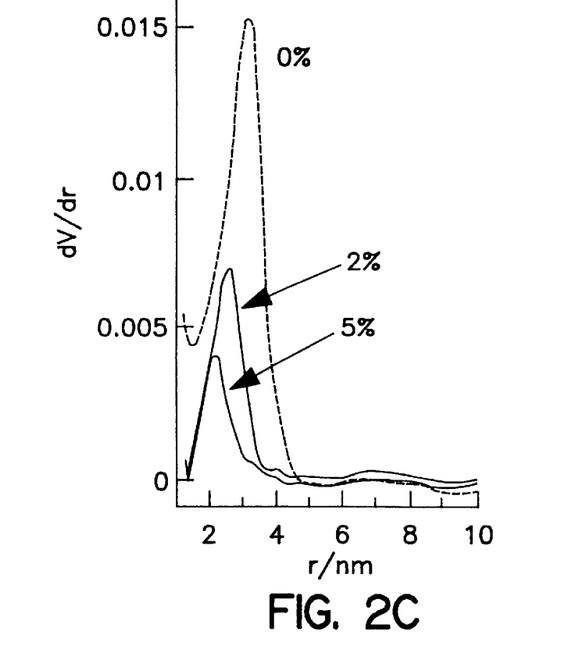
Figure 2D:
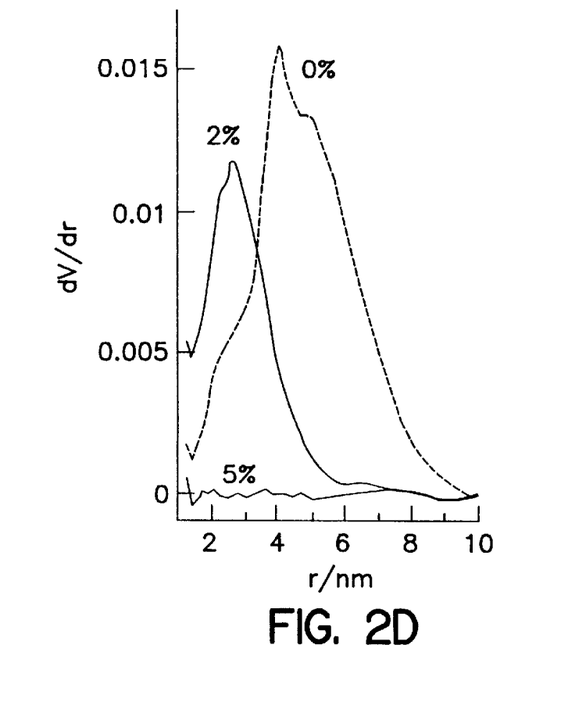

As shown by the dotted lines, the $N_2$ adsorption isotherms of MSU-1 (FIG. 2A) and MSU-2 (FIG. 2B) both featured well-resolved inflexions at partial pressures between 0.3 and 0.6, demonstrating the existence of uniform mesopore channels with diameters of 32 Å (FIG. 2C) and 41 Å (FIG. 2D), respectively, as calculated using the Horvath-Kawazoe pore size distribution model (Horvath, G., et al., J. Chem. Eng. Jap 16, 470 (1983)). No appreciable hysteresis loops were observed in any of the isotherms' desorption branches, denoting the absence of bottlenecking in the pore channels. The surfactant extraction technique was thus effective in removing the surfactant from the pore channels without damaging the structure of the synthesized materials. The large BET surface areas measured were likewise consistent with the presence of highly porous materials (Table 1). As shown by the solid lines, the isotherms of the organic functionalized derivatives MP-MSU-1-2% (FIG. 2A) and MP-MSU-2-2% (FIG. 2B) were also indicative of mesoporosity, but the shifts observed in the positions of the inflexions (to between 0.1 and 0.3) show that constrictions in the pore channels have arisen. This can be attributed to both the lattice contractions and to the presence of the mercaptopropyl (MP) moieties which line the pore channel walls, thus reducing the pore diameters and volumes of the mesostructures (FIGS. 2C and 2D). Despite pore constriction, the organic functionalized materials nonetheless retained the very high surface areas characteristic of mesoporous molecular sieves (Table 1).

As shown by the solid lines, the isotherms of the increasingly loaded MP-MSU-1-5% and MP-MSU-2-5% mesostructures demonstrated an even greater constriction of the pores (Table 1), resulting in further reduction of total pore volume in MP-MSU-1-5% (FIG. 2B) and no discernable porosity in MP-MSU-2-5% (FIG. 2D). The significant decreases in surface areas for both of these materials (Table 1) further substantiate these observations. Since all of the functionalized materials are shown to exhibit crystallographic ordering according to their XRD patterns (FIGS. 1A and 1B), the incremental featurelessness observed in their $N_2$ isotherms can be explained by the influence of the increasing amounts of mercaptopropyl groups lining the framework channels, disrupting the uniformity of the pores and reducing their diameters.

The SEM images of the materials revealed aggregates of ultrafine spherical particles with a "cotton ball"-like morphology. The particles appeared to be quite uniform in size with diameters averaging about 0.3 $\mu$m for all compositions. The minute sizes of these particles creates significant textural porosity within the mesostructure aggregates, resulting in notable sloping of the nitrogen adsorption curves beyond the mesopore inflexions, as well as significant nitrogen uptake observed at relative pressures approaching 1 (FIGS. 2A and 2B).

The $^{29}$Si MAS-NMR spectra of the functionalized mesostructured (recorded with a 600 s pulse delay to allow the full relaxation of the Si magnetization between acquisitions) denoted the presence of the following Si sites: $Q^4$ signals at −110 ppm ((SiO)$_4$Si), $Q^3$ signals at −101 ppm ((SiO)$_3$SiOH) (both corresponding to framework silica derived from hydrolyzed TEOS), and $T^2$ and $T^3$ signals (at −60 and −65 ppm, respectively) corresponding to the organosilane (mercaptopropylsilane) silicon atoms (Burkett, S. L, et al., J. Chem. Soc., Chem. Commun. 1367 (1996)). In all cases, the $Q^4/Q^3$ signal intensity ratios were close to 1.5, while the intensities of the $T^2$ and $T^3$ signals increased as a function of organosilane loading in the materials. By comparing the integrations of these NMR signals, in combination with the elemental analysis results (for S content), the functional group content in the mesostructure was deduced and expressed in Table 1 both in terms of S content and organosilane percentage. Although the amount of organosilane incorporated into the MP-MSU-1 materials was found to be close than expected on the basis of the stoichiometry of the solution reaction mixture, the functional group loading in MP-MSU-2-2% and MP-MSU-2-5% exceeded this content by a factor of about 1.5 (Table 1). This suggests that preferential assembly of the organosilane molecules has occurred at the interface of the TRITON-X micelles. Since the overall yield of the materials syntheses is relatively low (about 25%), the partitioning of both framework-building molecules (TEOS and MPTMS) at the interface of the micelle template thus appears to be an important synthesis parameter for these materials. This apparent partitioning effect may be explained by the greater hydrophobicity of the TRITON-X micelle core (consisting of a branched octane and a phenyl group compared to that of TERGITOL-15-S-12 (composed of an alkyl chain), resulting in greater affinity of the assembly surfactant towards the organosilane molecules. The dramatic lattice contractions observed in the TRITON-X-assembled mesostructures is likely related to this phenomenon, since the MPTMS molecules may penetrate deep into the micelles because of strong lyophilic interactions.

Despite the relatively low yields of the synthesis procedure, the one-step preparation of functionalized mesoporous silica by non-ionic surfactant assembly presents a clear advantage over methodologies involving charged quaternary ammonium surfactants, namely that it does not necessitate the use of potentially destructive acid leaching to remove the framework-bound surfactant from the mesostructures. The extraction of the non-ionic surfactant can thus be readily achieved by the straightforward washing of the as-synthesized materials with a suitable solvent (such as ethanol). Moreover, the assembly process described in this paper is achieved under neutral pH conditions, unlike the other direct-synthesis approaches which were performed in alkaline environments (Burkett, S. L., et al., J. Chem. Soc., Chem. Commun. 1367 (1996); Fowler, C. E., et al., J. Chem. Soc., Chem. Commun. 1769 (1997); Lim, M. H., et al., Chem. Matr. 10, 467 (1998); and Van Rhijn, W. M., et al., J. Chem. Soc., Chem. Commun. 317 (1998)). This feature connotes the possibility of incorporating organic functionalities that would be unstable or otherwise reactive under non-neutral pH conditions such as strongly electrophilic functionalities.

EXAMPLE 3

Chloroalkyl functionalities have been successfully incorporated into mesostructured frameworks following the synthetic protocol described in Examples 1 and 2 as evidenced by XRD. These were prepared by stirring TEOS and chloropropyl trimethoxysilane in solutions of TERGITOL 15-S-12 (0.02 mol L$^{-1}$) and TRITON-X100 (0.027 mol L$^{-1}$) until a clear mixture formed.

Samples:

These were prepared following exactly the same protocol as that described in Examples 1 and 2, except that an equimolar quantity of chloropropyltrimethoxysilane was used as the organosilane agent instead of mercaptopropyltrimethoxysilane. The XRD patterns and N$_2$ adsorption isotherm of the materials thus obtained were virtually identical to those of the mercaptopropyl (MP) derivative described in Examples 1 and 2. $^{29}$MAS-NMR and X-ray fluorescence measurements confirmed the presence of chloro groups in the samples in quantities similar to those of the sulfoxyl groups in the MP-derivatized analogs.

Another potential advantage of using poly(oxyalkylene) polymer based non-ionic structure-directing agents is their reported ability to form mesostructures of variable pore diameters by controlling the temperature of the assembly process (Prouzet E., et al., Angew. Chem. Int. Ed. Eng. 36, 516 (1997)). The temperature and organosilane concentration on the incorporation of organic moieties into non-ionic surfactant assembled mesostructures represent another variable for control.

It is intended that the foregoing description be only illustrative and that the present invention be limited only by the hereinafter appended claims.

We claim:

1. A method for the preparation of a porous synthetic, semi-crystalline hybrid organic-inorganic silicon oxide composition -with an organic group of 1 to 25 carbon atoms containing an element selected from the group consisting of O, N, S, F, I, Br, Cl and combinations thereof linked through a silicon carbon bond to a surface of walls forming pores which comprises:

(a) providing as a solution a mixture of (i) a silicon oxide precursor; (ii) a neutral polymeric surfactant which comprises poly(oxyalkylene) polymer as a template having a hydrophobic and a hydrophilic moiety; and (iii) a hydrolyzable organic silicon compound selected from the group consisting of an alkoxide and a halide with the organic group linked to the silicon of the silicon compound, wherein the organic group contains an element selected from the group consisting of O, N, S, F, I, Br, Cl and combinations thereof;

(b) mixing the solution to form a precipitated composition in the presence of a solvent comprising water so that the hydrolyzable organic silicon compound is hydrolyzed; and (c) removing the surfactant from the precipitated composition by solvent extraction to form the organic-inorganic silicon oxide composition, so that the organic group linked through the silicon-carbon bond is on the surface of the walls forming the pores.

2. A method for the preparation of a porous synthetic semi-crystalline hybrid organic-inorganic silicon oxide composition-with an organic group of 1 to 25 carbon atoms containing an element selected from the group consisting of O, N, S, F, I, Br, Cl and combinations thereof linked through a silicon carbon bond to a surface of walls forming pores which comprises:

(a) providing as a solution a mixture of (i) a silicon oxide precursor; (ii) a non-ionic polymeric surfactant which comprises a poly(oxyalkylene) polymer as a template having a hydrophobic and a hydrophilic moiety; (iii) a hydrolyzable organic silicon compound selected from the group consisting of an alkoxide and a halide with the organic group linked through the silicon carbon bond; and (iv) a hydrolyzing agent;

(b) mixing the solution to form a precipitated composition in the presence of a solvent comprising water so that the hydrolyzable organic silicon compound is hydrolyzed; and (c) removing the surfactant from the precipitated composition by solvent extraction to form the organic-inorganic silicon oxide composition, so that the organic group linked through the silicon carbon bond is on the surface of the walls forming the pores linked to the silicon.

3. The method of any one of claims 1 or 2 wherein the composition is prepared by a random order of addition of the surfactant, silicon oxide precursor, and the hydrolyzable organic silicon compound in step (a).

4. The method of any one of claims 1 or 2 wherein the silicon oxide precursor is selected from the group consisting of a silicon alkoxide, a silicic acid, a silicon complex, a colloidal silicon oxide solution, a silicon oxide sol, silicon halide, silicon acetylacetonate, silicon 1,3-diketonate, a silicate anion, and mixtures thereof.

5. The method of any one of claims 1 or 2 wherein the solvent in step (b) further comprises a non-protic organic solvent.

6. The method of any one of claims 1 or 2 wherein the surfactant is selected from the group consisting of primary, secondary and tertiary fatty alcohol poly(ethoxylates), alkyl phenol poly(ethoxylates), fatty acid ethoxylates, poly (ethylene oxide-propylene oxide) block copolymers, primary and secondary fatty primary amine poly (ethoxylates), fatty acid poly(ethylene oxide-propylene oxide) block co-polymers, fatty acid alkanolamides as ethoxylates, sorbitan esters as ethoxylates, sorbitan ethoxylates, polyamine propoxylate ethoxylates and mixtures thereof.

7. The method of claim 1 wherein the composition is represented by the anhydrous oxide formula:

$SiO_2(SiO_{1.5}R_{1.0})_x$ wherein R is the organic group incorporated into the framework; Si is a silicon atom; O is oxygen and x is between 0.01 and 0.25.

8. The method of any one of claims 1 or 2 wherein the solution in step (b) in addition contains an inorganic oxide precursor which is a Me alkoxide thereof where Me is selected from the group consisting of Al, Cr, Fe, Ga, Ge, Mg, Mo, Nb, Sb, Sn, Ti, V, Si, W, Zr and mixtures thereof.

9. The method of claim 8 wherein the mole ratio of hydrolyzed organic silicon compound which provides the organic group linked to silicon to the Me alkoxide is between about 0.01 and 0.25.

10. The method of claim 1 or 2 wherein the solution is at a basic pH.

11. The method of claim 1 wherein the organic silicon compound has the formula:

where X is selected from the group consisting of a chloride, bromide and an alkoxy group containing 1 to 4 carbon atoms which is hydrolyzable and wherein R is the organic group.

12. The method of any one of claims 1 or 2 wherein the organic group comprises a mercapto group.

13. The method of any one of claims 1 or 2 wherein the hydrolyzable organic silicon compound is mercaptopropyl-trimethyloxysilane.

14. A method for the preparation of a porous synthetic, semi-crystalline hybrid organic-inorganic silicon oxide composition with an organic group of 1 to 25 carbon atoms linked through a silicon carbon bond to a surface of walls forming pores which comprises:

(a) providing as a solution a mixture of (i) a silicon oxide precursor; (ii) a neutral polymeric surfactant which comprises poly(oxyalkylene) polymer as a template having a hydrophobic and a hydrophilic moiety; and (iii) a hydrolyzable organic silicon compound selected from the group consisting of an alkoxide and a halide with the organic group linked to the silicon of the silicon compound;

(b) mixing the solution to form a precipitated composition in the presence of a solvent comprising water so that the hydrolyzable organic silicon compound is hydrolyzed; and (c) removing the surfactant from the precipitated composition by solvent extraction to form the organic-inorganic silicon oxide composition, so that the organic group linked through the silicon-carbon bond is on the surface of the walls forming the pores, wherein the composition is represented by the anhydrous oxide formula:

$SiO_2(SiO_{1.0}R_{2.0})_x$ where R is the organic group incorporated into the framework, Si is a silicon atom, O is oxygen and x is between 0.01 and 0.25.

15. The method of claim 14 wherein R is a $C_iH_{2i+1}$ alkyl group and wherein i is 1 to 25.

16. The method of claim 14 in which the organic group comprises one or more functional groups selected from the groups consisting of a metal; vinyl; cyano; amino; epoxide; mercapto; a halogen selected from the group consisting of F, Br and Cl; a hydroxide; an aldehyde; a ketone; an acid, a base, and combinations thereof.

* * * * *

UNITED STATES PATENT AND TRADEMARK OFFICE
CERTIFICATE OF CORRECTION

PATENT NO.    : 6,465,387 B1
DATED         : October 15, 2002
INVENTOR(S)   : Thomas J. Pinnavaia and Louis Mercier It is certified that error appears in the above-identified patent and that said Letters Patent is hereby corrected as shown below:

Title page,
Item [63], Related U.S. Application Data, "No. 09/375,306" should be
-- No. 09/373,306 --.

Column 1,
Line 14, "was sponsered" should be -- was sponsored --.

Column 2,
Line 44, "Quaternary tetrapropyl" should be -- quaternary tetrapropyl --.

Column 11,
Line 21, "Methacryloxyproopyl" should be -- 3-Methacryloxypropyl --.
Line 24, "trimethyoxysilane" should be -- trimethoxysilane --.

Signed and Sealed this

Fourth Day of February, 2003

JAMES E. ROGAN
*Director of the United States Patent and Trademark Office*